United States Patent
Wu et al.

(10) Patent No.: US 8,755,652 B2
(45) Date of Patent: Jun. 17, 2014

(54) MULTI-CHANNEL OPTICAL SIGNAL MONITORING DEVICE AND METHOD

(75) Inventors: Ming Wu, Pleasanton, CA (US); Peter G. Wigley, Corning, NY (US)

(73) Assignee: Oclaro Technology Limited, Towcester (GB)

( * ) Notice: Subject to any disclaimer, the term of this patent is extended or adjusted under 35 U.S.C. 154(b) by 90 days.

(21) Appl. No.: 13/226,275

(22) Filed: Sep. 6, 2011

(65) Prior Publication Data

US 2012/0019810 A1     Jan. 26, 2012

Related U.S. Application Data

(63) Continuation-in-part of application No. 12/927,066, filed on Nov. 5, 2010, which is a continuation-in-part of application No. 12/804,627, filed on Jul. 26, 2010, now Pat. No. 8,577,192.

(51) Int. Cl.
*G02B 6/32* (2006.01)
*G01N 21/00* (2006.01)

(52) U.S. Cl.
USPC .......................................... 385/33; 356/73.1

(58) Field of Classification Search
USPC .......................................... 385/33; 356/73.1
See application file for complete search history.

(56) References Cited

U.S. PATENT DOCUMENTS

| | | | |
|---|---|---|---|
| 4,923,270 A | 5/1990 | Carter | |
| 6,654,157 B2 | 11/2003 | Islam et al. | |
| 6,704,487 B2 | 3/2004 | Parhami et al. | |
| 6,798,551 B2 | 9/2004 | Gu | |
| 6,891,676 B2 | 5/2005 | Ford et al. | |
| 6,992,777 B2 | 1/2006 | Han et al. | |
| 7,016,098 B2 | 3/2006 | Giles et al. | |
| 7,236,660 B2 | 6/2007 | Ducellier et al. | |
| 7,340,128 B2 | 3/2008 | Shibata et al. | |
| 7,362,930 B2 | 4/2008 | Davis et al. | |
| 7,440,648 B2 | 10/2008 | Oikawa et al. | |
| 7,672,585 B2 * | 3/2010 | Sone et al. | 398/45 |
| 7,720,329 B2 | 5/2010 | Presley et al. | |
| 2001/0038730 A1 | 11/2001 | Sorin et al. | |
| 2002/0005970 A1 | 1/2002 | Lang | |

(Continued)

FOREIGN PATENT DOCUMENTS

| | | |
|---|---|---|
| CN | 1656721 A | 8/2005 |
| CN | 1831574 A | 9/2006 |

(Continued)

OTHER PUBLICATIONS

The State Intellectual Property Office of the People's Republic of China, Second Office Action, Chinese Patent Application No. 201110210059.X, Mar. 21, 2013, 15 pages.

(Continued)

*Primary Examiner* — Jerry Blevins
(74) *Attorney, Agent, or Firm* — Fenwick & West LLP

(57) ABSTRACT

A light detector measures optical power of light incident thereon. Using a beam steering device that is rotatable about two orthogonal axes, wavelength components of different channels are scanned onto the light detector in accordance with programmable parameters. The programmable parameters specify the light detector to which the wavelength components are directed, the order the wavelength components are monitored by the light detector, and the time duration over which each of the wavelength components is monitored by the light detector.

17 Claims, 12 Drawing Sheets

(56) References Cited

U.S. PATENT DOCUMENTS

| | | | |
|---|---|---|---|
| 2004/0156581 A1 | 8/2004 | Golub et al. | |
| 2006/0228070 A1 | 10/2006 | Davis et al. | |
| 2006/0257091 A1 | 11/2006 | Tabuchi et al. | |
| 2009/0103861 A1 | 4/2009 | Presley et al. | |
| 2009/0304328 A1* | 12/2009 | Presley et al. | 385/16 |
| 2010/0150563 A1 | 6/2010 | Nakajima | |
| 2012/0020617 A1 | 1/2012 | Wu | |

FOREIGN PATENT DOCUMENTS

| | | |
|---|---|---|
| CN | 1996075 A | 7/2007 |
| CN | 101384933 | 3/2009 |
| CN | 202339423 U | 7/2012 |
| WO | WO 2007/078415 A2 | 7/2007 |

OTHER PUBLICATIONS

Patent Cooperation Treaty, Written Opinion of the International Search Authority, International Patent Application No. PCT/US2010/002449, mailed Nov. 2, 2010, 6 pages.

Patent Cooperation Treaty, International Search Report, International Patent Application No. PCT/US2010/002449, mailed Nov. 2, 2010, 2 pages.

Patent Cooperation Treaty, Written Opinion of the International Search Authority, International Patent Application No. PCT/US2011/045424, mailed Dec. 5, 2011, 9 pages.

Patent Cooperation Treaty, International Search Report, International Patent Application No. PCT/US2011/045424, mailed Dec. 5, 2011, 2 pages.

Patent Cooperation Treaty, Written Opinion of the International Search Authority, International Patent Application No. PCT/US2011/059448, mailed Apr. 4, 2012, 4 pages.

Patent Cooperation Treaty, International Search Report, International Patent Application No. PCT/US2011/059448, mailed Apr. 4, 2012, 2 pages.

The State Intellectual Property Office of the People's Republic of China, First Office Action, Chinese Patent Application No. 201110210059.X, mailed Aug. 17, 2012, 17 pages.

The United States Patent and Trademark Office, Final Rejection, U.S. Appl. No. 12/804,627, mailed Jan. 31, 2013, 16 pages.

The United States Patent and Trademark Office, Non-Final Rejection, U.S. Appl. No. 12/804,627, mailed May 11, 2012, 20 pages.

United States Patent and Trademark Office, Non-Final Rejection, U.S. Appl. No. 12/927,066, Jun. 10, 2013, 18 pages.

* cited by examiner

X-PLANE CROSS-SECTION

Y-PLANE CROSS-SECTION

MULTI-CHANNEL OPTICAL SIGNAL MONITORING DEVICE AND METHOD

CROSS-REFERENCE TO RELATED APPLICATION(S)

This application is a continuation-in-part of U.S. patent application Ser. No. 12/927,066, filed Nov. 5, 2010, which is a continuation-in-part of U.S. patent application Ser. No. 12/804,627, filed Jul. 26, 2010 now U.S. Pat. No. 8,577,192. The entire contents of both of these applications are incorporated by reference herein.

BACKGROUND

Optical devices that perform optical filtering and can be tuned to select one or more narrow band of wavelengths from a wider wavelength spectrum are known as tunable optical filters. They are used in a variety of optical systems, e.g., wavelength division multiplexed (WDM) systems. In WDM systems that operate typically over wavelength bands of tens of nanometers, tunable optical filters are used for optical performance monitoring (OPM) to ensure that signal power, signal wavelength, and/or signal to noise ratios (OSNR) are within specified limits. Other applications for tunable optical filters include optical noise filtering, noise suppression, wavelength division demultiplexing, and optical routing.

Complex state-of-the-art dense wavelength division multiplexed (DWDM) systems have many channels operating across a wide optical spectrum. Monitoring these channels is a challenge because many measurements are required. A monitoring equipment that reduces the time and complexity of performing these measurements can significantly increase overall system performance and reduce system costs.

SUMMARY OF THE INVENTION

One or more embodiments of the present invention provide an optical signal monitoring technique that employs programmable parameters for monitoring optical channels of the optical signal so that the optical performance measurements of the optical channels can be customized on a per-channel basis. In particular, the time duration for monitoring each channel can be adjusted up or down based on various factors such as signal intensity and signal-to-noise ratio.

A method of monitoring optical channels of an optical signal, according to an embodiment of the present invention, includes the steps of retrieving parameters for monitoring the optical channels including a first time period and a second time period, transmitting the optical signal through an optical port, dispersing the optical signal, directing a first portion of the dispersed optical signal to a light detector for a first time duration equal to the first time period and measuring an optical power thereof, and directing a second portion of the dispersed optical signal to the light detector for a second time duration equal to the second time period and measuring an optical power thereof.

An optical signal monitoring device, according to an embodiment of the present invention, includes an optical port through which an optical signal having multiple optical channels is transmitted, a light dispersion element positioned in an optical path of the optical signal to disperse the optical signal, a light detector, and a beam steering element for directing a first portion of the dispersed optical signal to the light detector for a first time duration equal to a first programmable value and for directing a second portion of the dispersed optical signal to the light detector for a second time duration equal to a second programmable value. The first programmable value corresponds to a time period for monitoring a first optical channel and the second programmable value corresponds to a time period for monitoring a second optical channel.

Further embodiments of the present invention include a non-transitory computer-readable storage medium that includes instructions to be executed by a processing unit to cause an optical signal monitoring device to carry out the steps of retrieving parameters for monitoring the optical channels including a first time period and a second time period, controlling a beam steering element to attain a first position and maintaining the beam steering element in the first position for a first time duration equal to the first time period and, while the beam steering element is maintained in the first position, measuring an optical power of light incident on a light detector, and controlling the beam steering element to attain a second position and maintaining the beam steering element in the second position for a second time duration equal to the second time period and, while the beam steering element is maintained in the second position, measuring an optical power of light incident on the light detector.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
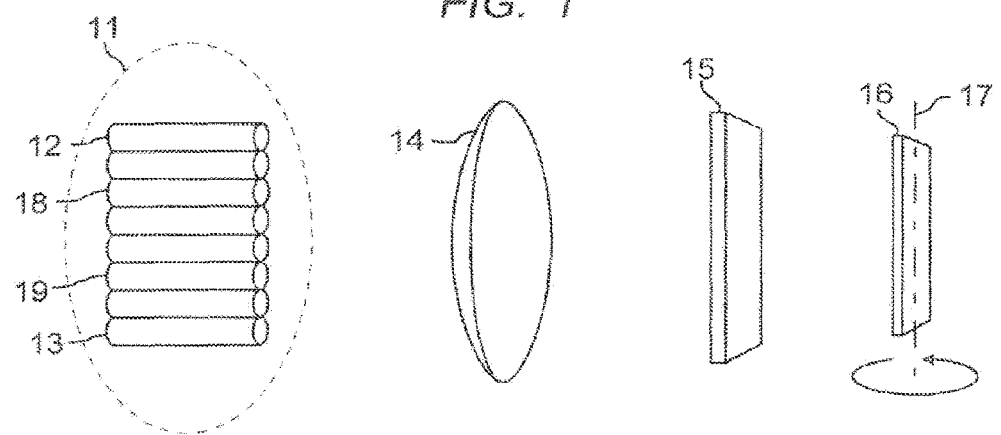
FIG. 1 is a perspective view showing a first embodiment of a tunable multiport optical filter.

FIG. 1 shows a first embodiment of a tunable multiport optical filter with an array of input and optical fibers shown at 11, and with collimating lens 14, dispersive element 15, and tuning mirror 16. The tuning mirror rotates around axis 17. It should be understood that this figure (and subsequent figures) is not drawn to scale. Optical elements are located and spaced according to their functions and properties as known in the art. The description herein uses x- and y-axial notations for directions around the z-axis, which is the direction of light propagation through the device. Reference herein to the x-plane or the y-plane will be understood to mean the x-z or y-z planes. Reference in the figures to the x-axis cross section or the y-axis cross section is intended to mean a view of the x-z plane or the y-z plane respectively.

The embodiments shown are described in the context of OPM applications. However, it should be understood that the basic devices described herein are also useful as wavelength selective devices for routing selected WDM channels.

Figure 2:
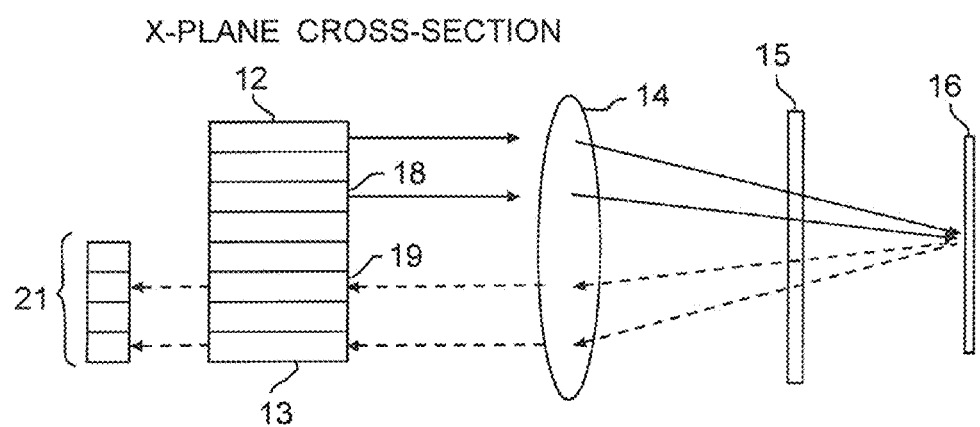
FIG. 2 is a schematic illustration the operation of the tunable multiport optical filter of FIG. 1, showing ray diagrams for the x- and y-directions of the device.
Figure 2:
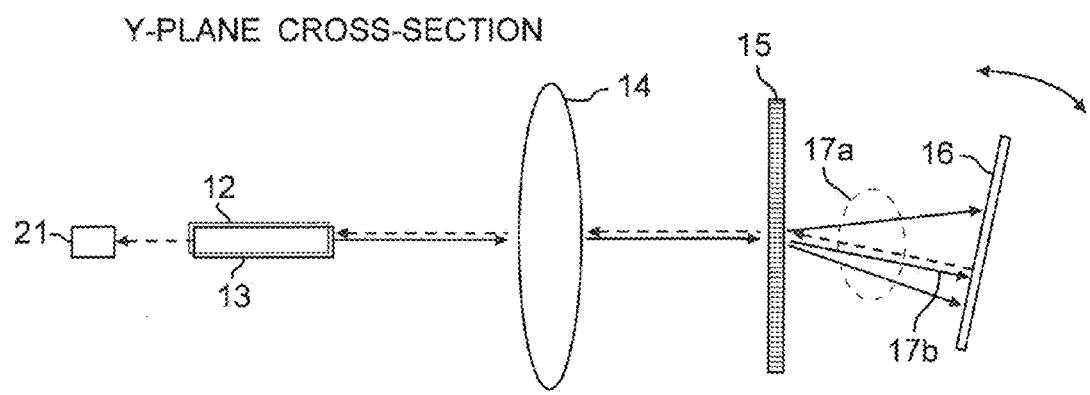

The specific optics as represented by ray optics, for the embodiment of FIG. 1, are illustrated in FIG. 2. The input fiber array 11 is composed by 8 fibers which are tightly aligned in parallel, i.e., the optical fibers have minimal spacing and are aligned with the centers of the optical fibers on a common axis, as shown the x-axis. The signal beam to be monitored, typically a tapped portion of the signal from one channel of the network, is coupled to input fiber 12. It passes through collimating lens 14 to collimate the Gaussian input beam to collimated light with suitable diameter. The collimated beam is incident onto dispersion element 15. In the x-axis cross section (top portion of FIG. 2) the beam is not dispersed. In the y-axis cross section (bottom portion of FIG. 2) the light beam from dispersion element 15 is dispersed into the wavelength components of the signal beam. The wavelength components 17a are angularly dispersed from the dispersion element in different directions depending on the wavelength of the beam. Tuning mirror 16 is positioned as shown to intersect the dispersed beam, and is rotatable about the x-axis and the y-axis.

The optical fibers are shown only schematically in the figures. Typically they will be standard single mode fibers with a cladding diameter of 125 microns and a core diameter of 10 microns or less. In the portion of the array shown, i.e., the portion addressed by the wavelength selection elements, the optical fibers are stripped of the usual polymer coating. This allows greater precision in the array, producing, in many cases, a predictable spacing between cores of the fibers. Recognizing that a variety of options in the format of the array may be desirable, as will be discussed in greater detail below, optical fibers with sizes other than the conventional 125 microns may be useful. For example, cladding diameters of 50, 62.5, 250, may be used to advantage to vary the overall aperture (size) of the array. It is expected that small aperture arrays may be most cost effective.

Mirror 16 is rotatable about the x-axis into one of many positions. In the example shown in FIG. 2, only one of the beam components (wavelength channels), in this case components represented by arrow 17b, is normal to the mirror 16. That beam component is reflected back along a path represented by the dashed line. Other beam components, like the two shown in the y-axis cross section of FIG. 2, will "walk-off" the mirror 16. The selected beam component, 17b, is dispersed by element 15 by the same angle as before and propagates to output fiber 13. The intensity of beam component 17b is measured by photodiode 21, coupled as shown to the output fiber 13. Input optical fiber 12 is shown in this view just to orient the viewer to the fact that the optical fibers in the array are stacked in the y-direction.

When mirror 16 is rotated about the x-axis, another beam component (wavelength channel) will be normal to the mirror 16 and will be selectively reflected back through output fiber 13 and its properties measured. In this manner, the wavelength spectrum of the input beam to optical fiber 12 may be scanned and the properties of all of its beam components can be measured.

Thus the device achieves wavelength selection and provides an optical filter. The wavelength of the filter is tuned by the rotational orientation of mirror 16.

It should be noted that a similar result can be obtained if the axis of the dispersive element is rotated by 90 degrees and the mirror is tilted in the same axis that the beam is dispersed. In this configuration the light beam from the grating is dispersed into the wavelength components of the signal beam along the same axis of the fiber array, and there is some likelihood that the spectra from a fiber port will overlap with an adjacent or non-adjacent fiber port. The wavelength components which are diffracted from the dispersion element can be distinguished by increasing the separation of the fiber ports, although this will require a large optical aperture. To obtain satisfactory performance fiber port separation would be increased to three or more times larger than the separation required when the axis of the dispersive element is orthogonal to the fiber array.

It should be understood that a function of the rotating mirror 16 is to select a wavelength component of the incident beam and return it to a fixed position, in the case of the arrangement of FIG. 2, to output optical fiber 13/detector 21. An equivalent result may be achieved using a refractive beam steering element, and tilting or translating the refractive element to select a given wavelength and steer it to a fixed output/detector. A simple implementation of this is a lens or a flat or wedged transparent plate. The output/detector is this case is located on a side of the plate opposite to the input optical fiber. In this description, reference to a mirror or to a beam steering element should be construed as referring to and including equivalent structures such as those just mentioned.

It should be recognized that the optical paths in the x-axis cross section of FIG. 2 are unchanged by the tilt of mirror 16 in the y-z plane. This is due to the fact that lens 14 focuses all input beams on the axis of rotation of the mirror. The reflecting surface along the tilt axis remains essentially fixed when the mirror is tilted.

The orientation of the mirror may be changed by an actuator or several actuators. The mirror may comprise a micro electro-mechanical system (MEMS), or comprise a discrete mirror driven by motors or any other types or actuators. The tilt of the mirror may be changed in one axis, or more than one axis.

Another WDM channel may be input as an input beam to optical fiber 18. The output of the beam components from this channel are directed through output optical fiber 19 and measured by the associated photodetector as shown in the top portion of FIG. 2.

It should be appreciated by those skilled in the art that, while the array of input optical fibers, e.g., 12 and 18, and the array of output fibers 13 and 19 are shown closely packed and precisely aligned, the device input optical fibers and the device output optical fibers may have any length and be routed in any suitable fashion to other components/couplers in the system. For example, the photodetectors 21 are shown as an array of elements receiving light beams directly from the closely packed array of output optical fibers. However, the optical fiber 13 may route an optical signal to a photodiode non-aligned with respect to the output array of optical fibers.

The detection device may take any of a variety of forms, and measure a variety of optical beam properties. The arrangement shown is simple and useful for illustration. If the input beams are suitably time division multiplexed, a single detection device may be used. Alternatively a single spectrum analyzer may be used as the detection device.

In this description the optical elements are shown as separate elements. These represent functional elements. The physical elements providing these functions may, in some cases, be combined as a single module. For example, a grating may have a reflective surface or an attached or integral lens.

Figure 3A:
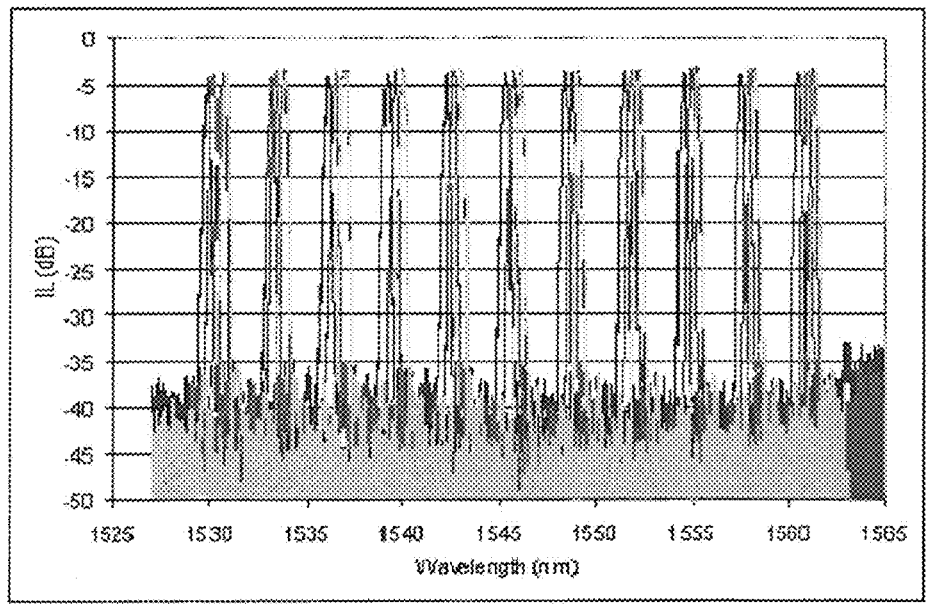
FIGS. 3A and 3B show performance data for the embodiment of FIG. 1.
Figure 3B:
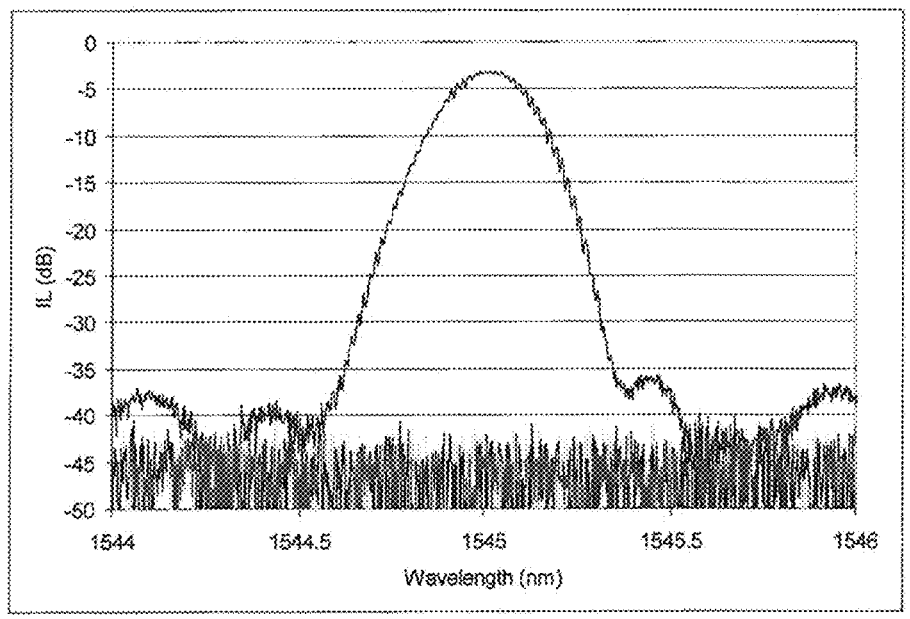

FIGS. 3A and 3B provide test results of a device built with the fiber array and optical figuration of FIGS. 1 and 2. The filter is characterized by optical spectrum analyzer (OSA). The light from a broadband light source is coupled to the input fiber. The output fiber is connected to the OSA, and the spectrum is taken. The spectrum shows that the filter produces high transmission in a narrow band. The location of the passband (filter wavelength) may be changed electronically as described by actuating the MEMS mirror control.

In the embodiments of FIGS. 1 and 2, the device is shown with a 1×8 fiber array, and can achieve 4 ports (4 tunable filters), in which all the ports are tuned simultaneously. In this array, all of the optical fibers are aligned in a single plane. The number of fibers may vary but typically will be an even number to produce pairs of fibers, each pair with an input fiber and an output fiber.

Figure 4A:
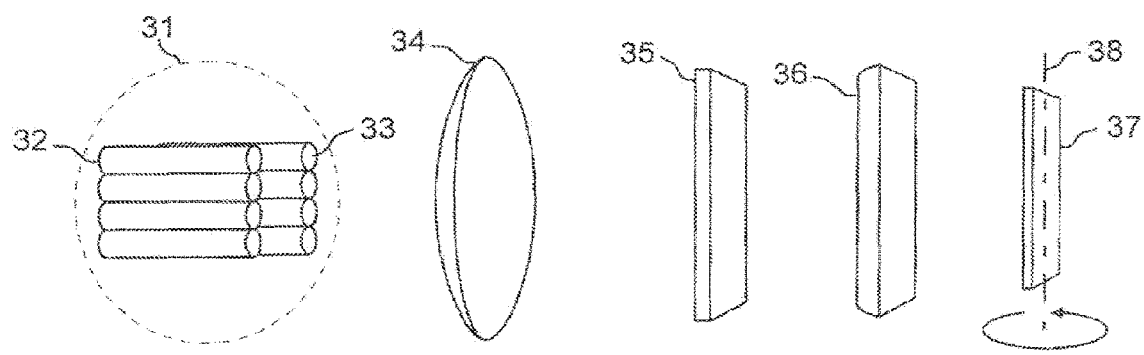
FIGS. 4A and 4B show various views of a second embodiment of a tunable multiport optical filter.
Figure 4B:
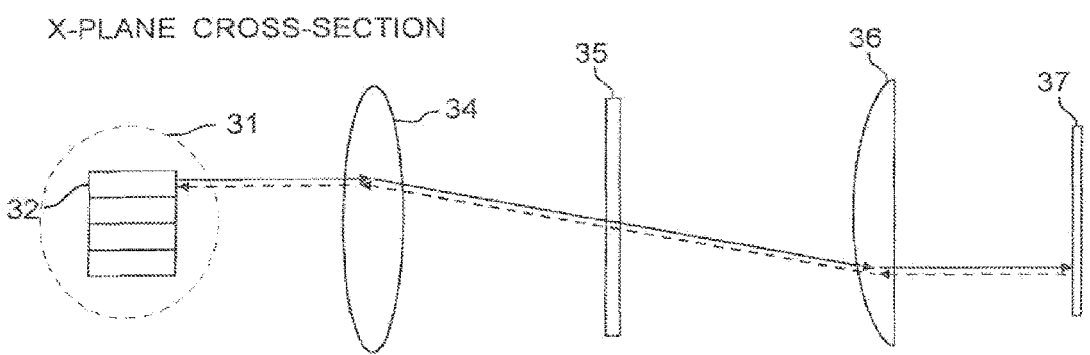

The fiber array may have other formats. In FIGS. 4A and 4B, the fiber array 31 is arranged in a 2×4 format to achieve a 4-port tunable filter. FIGS. 4A and 4B also show a different optical configuration. In the system of FIGS. 4A and 4B, two lenses are used. The first lens, 34, is a spherical or aspherical lens used to collimate the beam in both x- and y-directions. The second lens, 36, is a cylindrical lens. It focuses the input beam from input optical fiber 32 in the y-direction but does not focus the beam in x-direction. In this optical configuration, the returning light beam returns to the associated output optical fiber 33 with the same y-direction coordinates. For simplicity in the illustration the photodetectors have been omitted.

In the systems described it is not required that the ports be tuned simultaneously.

Figure 5:
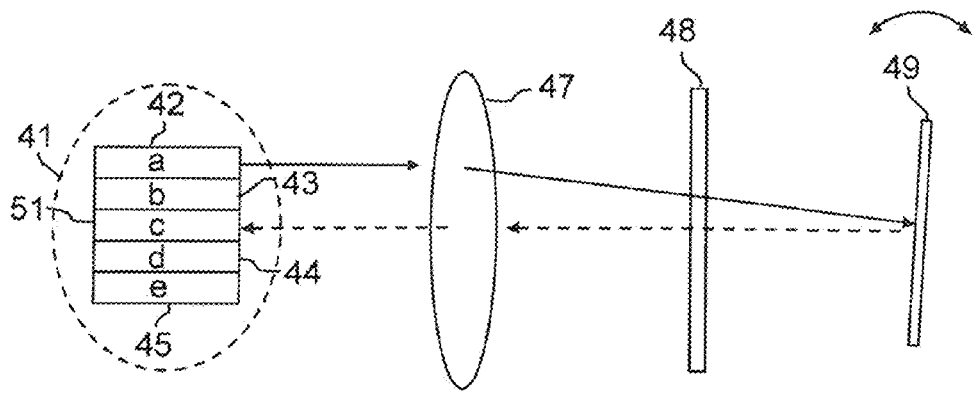
FIG. 5 is a schematic illustration similar to that of FIG. 2, showing ray diagrams for the x- and y-directions in the device of the second embodiment.
Figure 5:
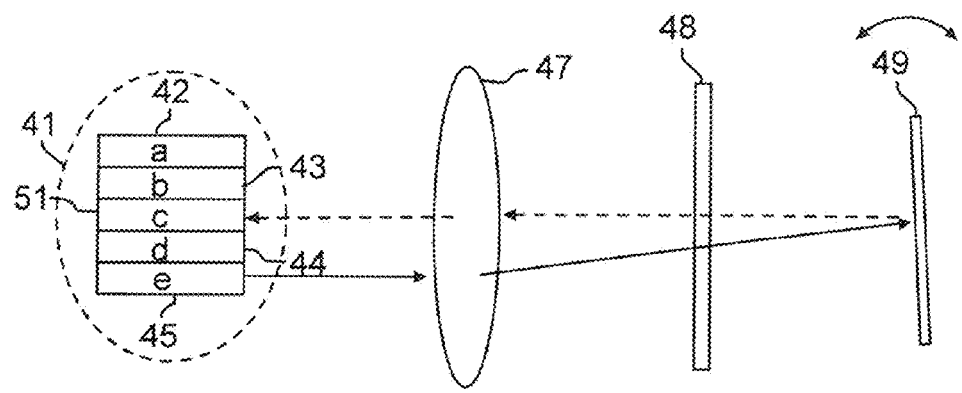

If the mirror orientation can be controlled by rotating it about 2 different axes, i.e., both the x-axis and the y-axis, then the ports can be read in series, i.e., there will be one input fiber and a number of output fibers. In FIG. 5, the optics are configured similarly as in FIGS. 1 and 2. However, the fiber array 41 is a 1×4 format array. When the mirror is rotated to a first angle about the y-axis, light from the upper input fiber 42 is coupled back to output fiber 51. When the mirror is rotated to a second angle, shown in the lower portion of FIG. 5, light from the lower input fiber 44 is coupled back to output fiber 51. By employing this method, multiple outputs from different input fibers 42-45 can be read in series. Note that the mirror still rotates about the x-axis to select the different wavelengths.

It should be evident that the number of optical fibers in a multiport optical filter according to the invention may vary widely. In embodiments like FIGS. 2 and 4 there will typically be at least three input optical fibers and three output optical fibers, producing a three port device array. In the embodiment like FIG. 5 there will preferably be at least two input optical fibers and one out put optical fiber, producing a three port device.

The light waveguides described above are optical fibers. However, other waveguide arrays may be substituted. For example, the arrays of optical waveguides may comprise optical integrated circuits (OIGs) where parallel waveguides are formed in a common substrate such as lithium niobate, doped glass, or indium phosphide. The term "waveguide" used herein is intended to include any suitable light guiding element.

Figure 4B:
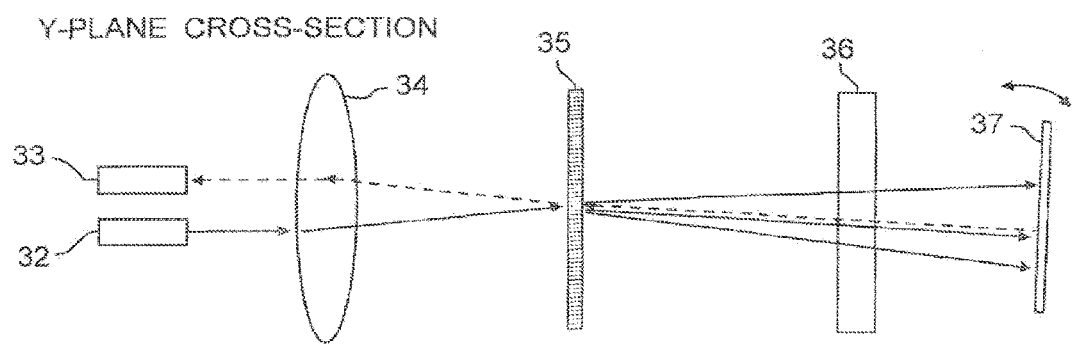

The placement of the optical fibers, both for the input side and the output side may vary significantly. In the embodiments of FIGS. 2 and 4, the optical fibers in the arrays are arranged in a single parallel plane. However, any x-y array configuration may be used.

As mentioned earlier, the devices described above may be used as wavelength selective devices in any application requiring that function. The embodiment shown in FIG. 5 for example shows four input ports and one output port. Many optical channels may be introduced into the input ports 42-45 while only a single wavelength exits at the output port 51 from any input port at one time. For this application the tilt of the reflector element 49 is controlled about two axes to pass only the channel selected for a specific input port. It then remains fixed until a different channel and port selection is made.

The device of FIG. 5 is shown as an n×1 device, where n denotes input(s) and 1 denotes output. However, it may also be easily modified to produce a 1×n device. Therefore the recited inputs and the output may be interchanged, or multiple inputs and output can be configured to monitor or route channels as determined by the input and output fiber orientations and the rotation of the reflector element 49 in both axes.

A wide variety of applications exist for wavelength selective devices. For example, channel selectors in DWDM transmission and display require a single channel to be selected among a large number of channel options. Recognizing that the reflector element can itself provide added functionality, optical systems may be employed in which the reflector is tilted to transmit a predetermined sequence of wavelengths. These may be used in coding devices.

In the embodiments described above, the reflector is tilted with respect to the dispersive element to achieve wavelength selectivity. However, devices may be designed in which the dispersive element is moved and the reflector is fixed. Likewise other optical elements, for example, lenses, may be used to achieve the same effect. All arrangements in which some controlled predetermined movement of a dispersive element with respect to a reflector or refractive element to achieve the purpose of the invention should be considered equivalent.

As mentioned earlier, the beam steering element is preferably a light reflecting element or a light refracting element. In both cases the element is typically operated as a moving element, e.g., a MEMS mirror or the like. Optionally, the beam steering function may be provided by a non-moving element, for example, an electro-optic device. In one embodiment using an electro-optic device the beam steering element relies on changes in refractive index of an electro-optic medium. The changes in refractive index may be used to change the direction of diffraction of a light beam being analyzed or switched.

Figure 6:
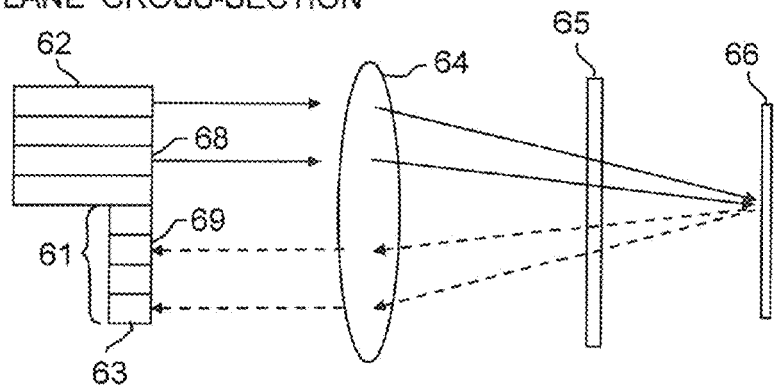
FIG. 6 is a schematic illustration similar to that of FIG. 5 showing an alternative arrangement.
Figure 6:
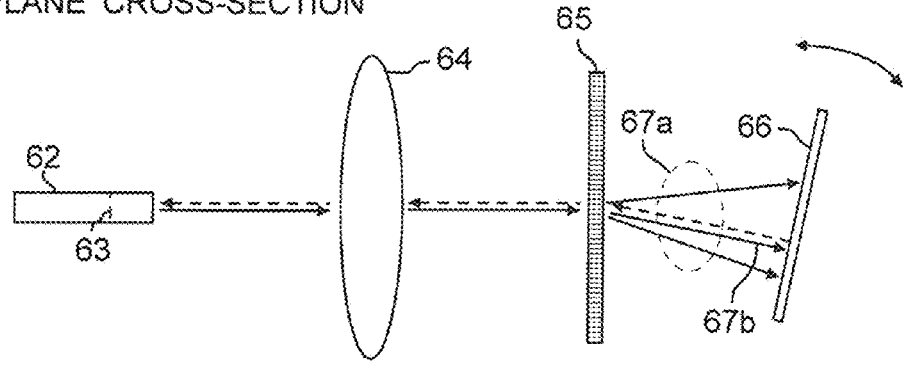

FIGS. 1, 2, 4, and 5 illustrate embodiments of the invention using an input array of optical fibers, and wavelength selective beam steering means for moving light beam components to one or more selected output optical fibers in an output array. That arrangement is suitable for many of the applications anticipated for the invention, and particularly those wherein the wavelength selective mechanism of the invention is used to implement optical switching functions. In the case of an OCM device, an output optical signal may not be needed. In such case, the output optical fiber array is not required. This modification is illustrated in FIG. 6, which is a modification of FIG. 2, and reference numbers 62 to 69 are associated with elements similar to 12-19 in FIG. 2. However, the output array of optical fibers is omitted in this embodiment and the selected wavelengths are incident directly on photodetectors 63 and 69 of photodetector array 61. As in the earlier embodiment, the photodetector array may be an optical spectrum analyzer.

With reference to FIG. 5, the operation described is a 4×1 device wherein optical fibers a, b, d, and e are input optical fibers, each associated with a single output optical fiber 43. In optical switching parlance this could be described as an X by 1 device, with X inputs and 1 output. The switching operation in these devices is operated sequentially since the wavelength selection is time divided. It is important to recognize that the sequence may be other than a, b, d, and e. It may be a, c, d, b, or any other suitable sequence. It is also important to recognize that the amount of time in anyone switching configuration can be arbitrary, allowing one or more ports to be prioritized over any other. Both the switching sequence and switching time can be arbitrarily sequenced and prioritized based on the application.

Alternatively, the device shown in FIG. 5 may be operated with multiple input optical fibers and multiple output optical fibers. For example, optical fibers a, and b, may be output optical fibers, and c, d, and e, input optical fibers. This would be equivalent to two 3×1 optical switches. Preferably, the input beams for input optical fibers a and b are time divided to maintain separation between the two optical switches.

Figure 7:
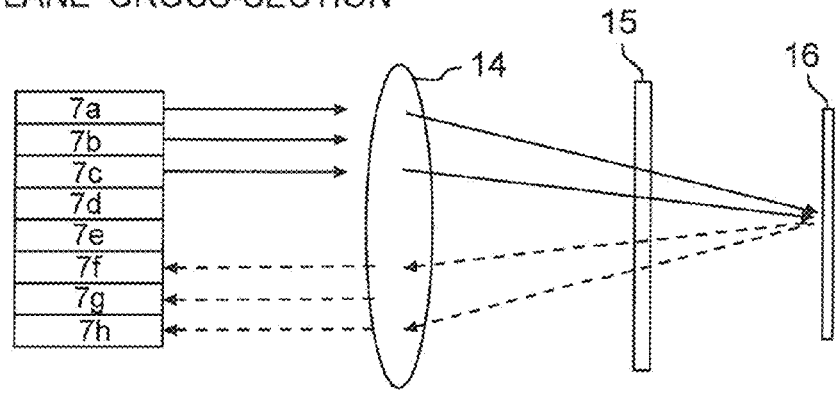
FIG. 7 illustrates an alternative approach to operating the devices described.

In another alternative embodiment the parallel readout implementation of the embodiment of FIG. 2 may be used in combination with a serial readout as in the embodiment of FIG. 5. This modification is illustrated in FIG. 7, where the optical fiber input array comprises eight optical fibers a, b, c, d, e, f, g, and h, and a corresponding optical fiber output array, optical fibers a and b operate in the parallel mode of FIG. 2, wherein output optical fibers f and g are dedicated outputs for input fibers a and b. Optical fibers c, d, e, and f operate in the serial mode of FIG. 5, as a 3×1 optical switch. Optical fiber c is shown as the output port, and optical fibers d, e, and f, the input ports.

These embodiments illustrate the very large versatility of devices operating according to the invention that operate with a wavelength selective mirror (for example) that may be tilted around more than one axis. In the arrangement shown, the rotation about the y-axis selects the beam position, i.e., the output port, while the rotation about the x-axis selects the wavelength. The biaxial rotation allows a selected wavelength component of an input beam to be directed as an output beam to any point in the x-y plane. This gives rise to another level of versatility in the design of devices operating according to the principles of the invention. This will be described in conjunction with the illustrations in FIGS. 8, 9, 10A and 10B.

Figure 8:
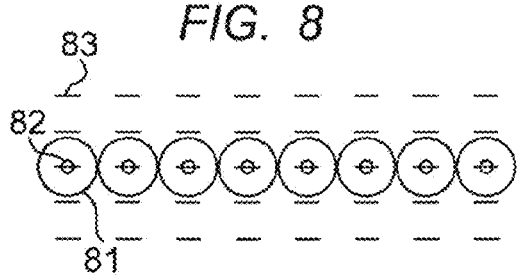
FIGS. 8, 9, 10A and 10B are views showing different output array formats useful in connection with various embodiments of the invention.

FIG. 8 shows eight output optical fibers in a linear array. The overall device includes one or more input optical fibers not shown. The device may perform any desired switching function X by Y where X may be one or more and Y may be one or more. For example, it may perform 1 by Y switching, X by 1 switching, or 2 by Y and X by 2 switching. The latter may be considered as combinations of the former.

The view in FIG. 8 is of the x-y plane in the manner of the previous figures. Each output optical fiber is shown with an optical fiber core 82, and an optical fiber cladding 81. The wavelength spectra are shown as seven bars 83 representing the output wavelengths. As described earlier, the spectra are generated by the wavelength selective elements. In FIG. 8 all eight spectrums are shown but typically in a one by n switch only one spectrum will be seen at a time. As described earlier, the rotation of the reflector (or other form of beam steering element) about the y-axis selects one of the eight output optical fibers shown. Rotation about the x-axis produces the wavelength spectrum. The wavelength spectrum in FIG. 8 is shown by five bars, with the center wavelength incident on the core of one of the output optical fibers.

While five wavelengths are illustrated in FIG. 8, there may be any number, typically more than 3. For an OCM device in a typical WDM system there may be 40, 80, 96, or more than 100 channels.

Figure 9:
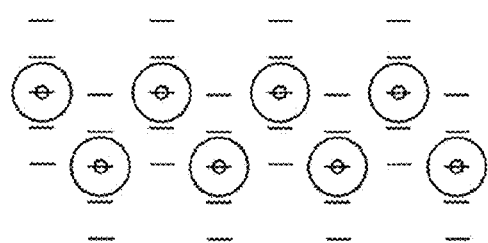

The output array in FIG. 8 is linear, with all output optical fibers located along an x-axis as shown. It is evident that the mirror that directs a chosen wavelength component to an output optical fiber/detector rotates about the x-axis through an angle sufficient to make all of the beam components incident on the output optical fiber. However, the mirror may rotate further so that the output spectrum of the wavelength selection elements may be displaced further. This allows output optical fibers to be located virtually anywhere in the x-y plane. This principle of operation is illustrated in FIG. 9, where four output optical fibers (the same elements as shown in FIG. 8) are located along a first x-axis, and four are located along a second x-axis, displaced from the first in the y-direction. The operation of the device may utilize suitable software for controlling the rotation of one or more of the beam selecting elements (typically the mirror) to route a selected beam component to selected output optical fiber/detector.

Figure 10A:
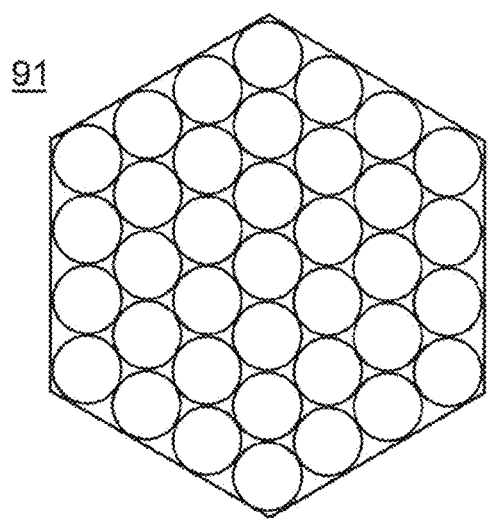
Figure 10B:
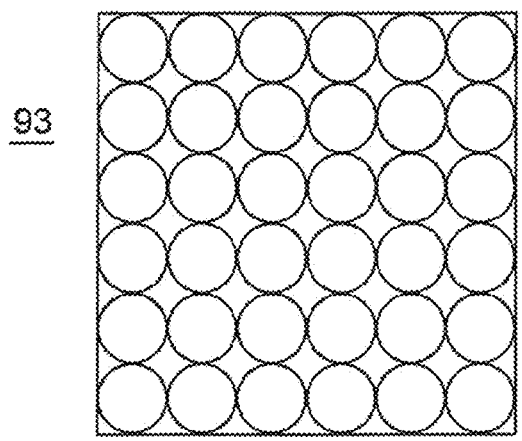

In FIG. 9, the optical fibers are shown spaced apart for clarity. In many cases it may be preferred to bundle the optical fibers in a close packed array. This allows the size of the aperture of the device to be optimized. Two such packed arrays are shown in FIGS. 10A and 10B. The array 91 in FIG. 10A has 37 optical fibers arranged in a hexagonal close-packed array for optimum packing density. To address each member of this array requires the rotation of the mirror to be changed in both axes for each address, and overall involves eight positions in the x-direction and eight positions in the y-direction. The array 93 of FIG. 10B has 36 optical fibers arranged in rows as shown. While this is a more loosely packed array, the address mechanism is slightly simpler, requiring only one change in x-direction position for each six changes in y-direction. It should be evident that with biaxial capability in the beam steering mechanism any x-y position may be addressed. This includes members in an array that is randomly organized.

It should be noted that the precision of the fiber array spacing in either x or y axes does not affect the performance provided the rotation of the mirror in the x or y axes can be optimized to minimize loss. This can be facilitated through a calibration process which stores a look up table with the location of the fibers stored, or using an optimization algorithm such as a hill-climbing algorithm that seeks to minimize the loss in any optical light path.

To identify or monitor the positions of the output optical fibers in an organized or random array it may be useful to employ a monitor that periodically locates the position of the members of the array. One suitable device for doing this is a CCO or CMOS imaging device which, when the output optical fibers are illuminated, can record the spatial position of each member in the array. A CCO imaging device is also useful as a light output detector in the normal operation of any of the devices or systems described earlier. If the CCO image plane is made as large as the aperture of the device it can serve as an output detector without regard to the precise locations of the individual members in the array.

As will be understood by those skilled in the art, arrays similar to those shown in FIGS. 8-10 may be used on the input optical fiber side as well as the output. The biaxial beam steering just described allows anyone, or combination, of a large array of inputs to address anyone, or combination, of a large array of outputs. Obviously smaller arrays, with any given number of input optical fibers and any given number of output optical fibers/detectors may be used. Accordingly, a very large number of OCM devices, or optical switches, may be designed using the principles of the invention.

Figure 11:
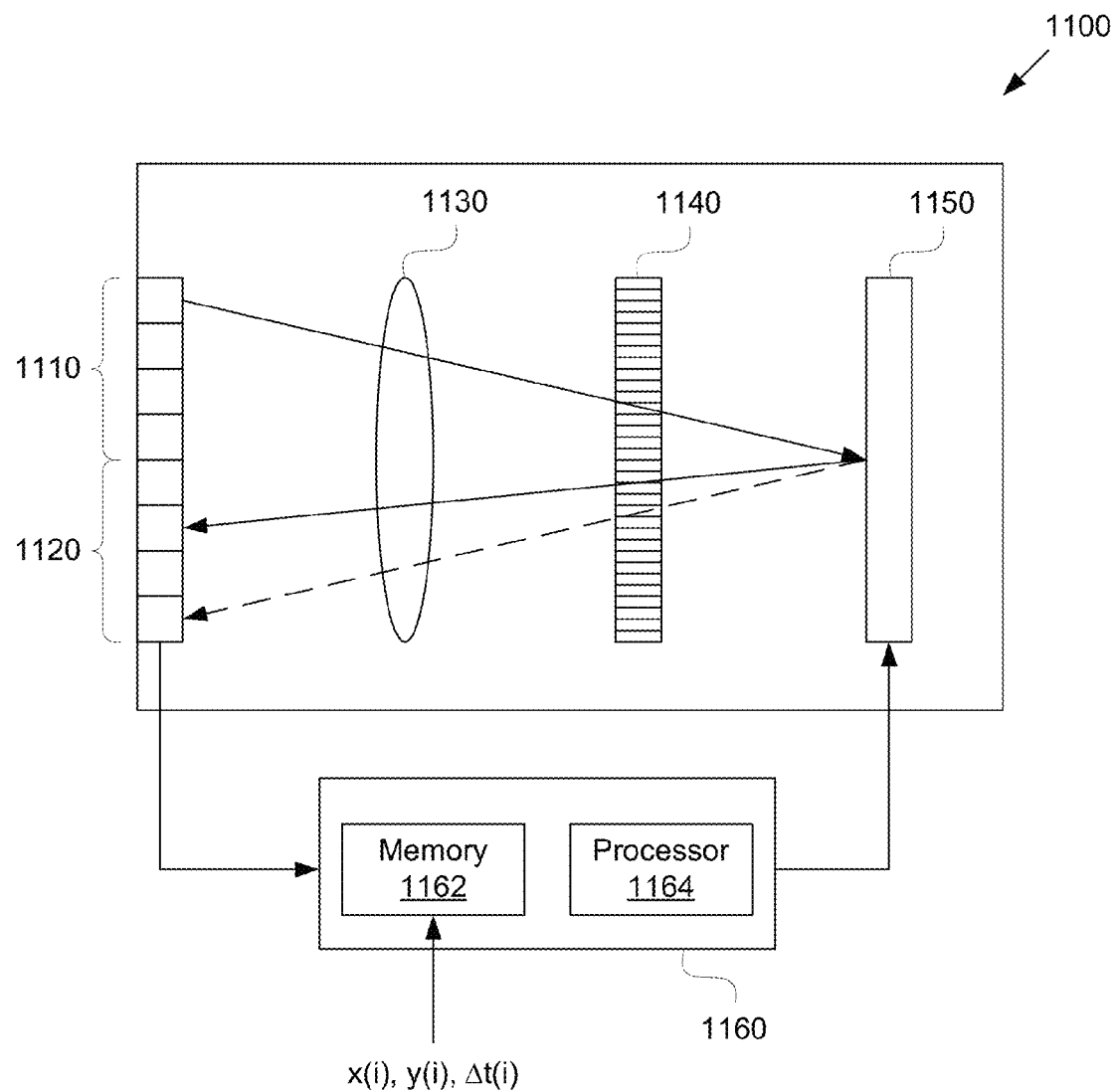
FIG. 11 is a block diagram of an optical channel monitoring (OCM) device according to an embodiment of the present invention.

FIG. 11 is a block diagram of an OCM device according to an embodiment of the present invention. OCM device 1100, as illustrated, includes 4 input optical ports 1110 and 4 photodetectors 1120, but it should be understood that the invention is applicable to an OCM device with any number of input optical ports and any number of photodetectors. OCM device 1100 further includes a collimating lens 1130, a dispersive element 1140, and a tuning mirror 1150. These three components of OCM device 1100 operate in substantially the same manner as collimating lens 14, dispersive element 15, and tuning mirror 16, described above.

A control unit 1160 for the OCM device 1100 is also illustrated in FIG. 11. The control unit 1160 includes a memory 1162, a processor 1164, and other components of a conventional computing device (not shown). Memory 1162 stores programmable parameters for monitoring optical signals received by OCM device 1100 through input optical ports 1110, and the optical power of different optical channels as measured based on signals from photodetectors 1120.

In the OCM device 1100, optical channel monitoring is performed according to control signals that are generated from the programmable parameters. The programmable parameters include for each channel an x-axis control value, a y-axis control value, and a time interval value. The x-axis control value is used to generate a control signal that causes tuning mirror 1150 to rotate about the x-axis to select the channel to be monitored. The y-axis control value is used to generate a control signal that causes tuning mirror 1150 to rotate about the y-axis to select the photodetector used for the optical channel monitoring. The time interval value associated with a channel signifies the amount of time tuning mirror 1150 is maintained at the position associated with the channel before moving to a different position. The time interval value associated with a channel ensures that the component of the input optical signal associated that channel is directed at the photodetector used for the optical channel monitoring for a time duration equal to the time interval value. If a particular channel has to be monitored for a longer duration, e.g., because the intensity of light incident on the photodetector is low or the SNR is low, this can be achieved by increasing the time interval value associated with that channel. Likewise, the time interval value associated with a channel may be decreased if the intensity of light incident on the photodetector is sufficiently high.

X-axis control, y-axis control, and time interval values, per optical channel, may be input or modified by the user of the OCM device 1100 or programmatically set. In one embodiment, the initial values of the x-axis control, y-axis control, and time interval are input by the user and the time interval values are adjusted up or down based on the intensity of the light being detected by the photodetectors 1120 or on the SNR of the signal from the photodetectors 1120.

Figure 12A:
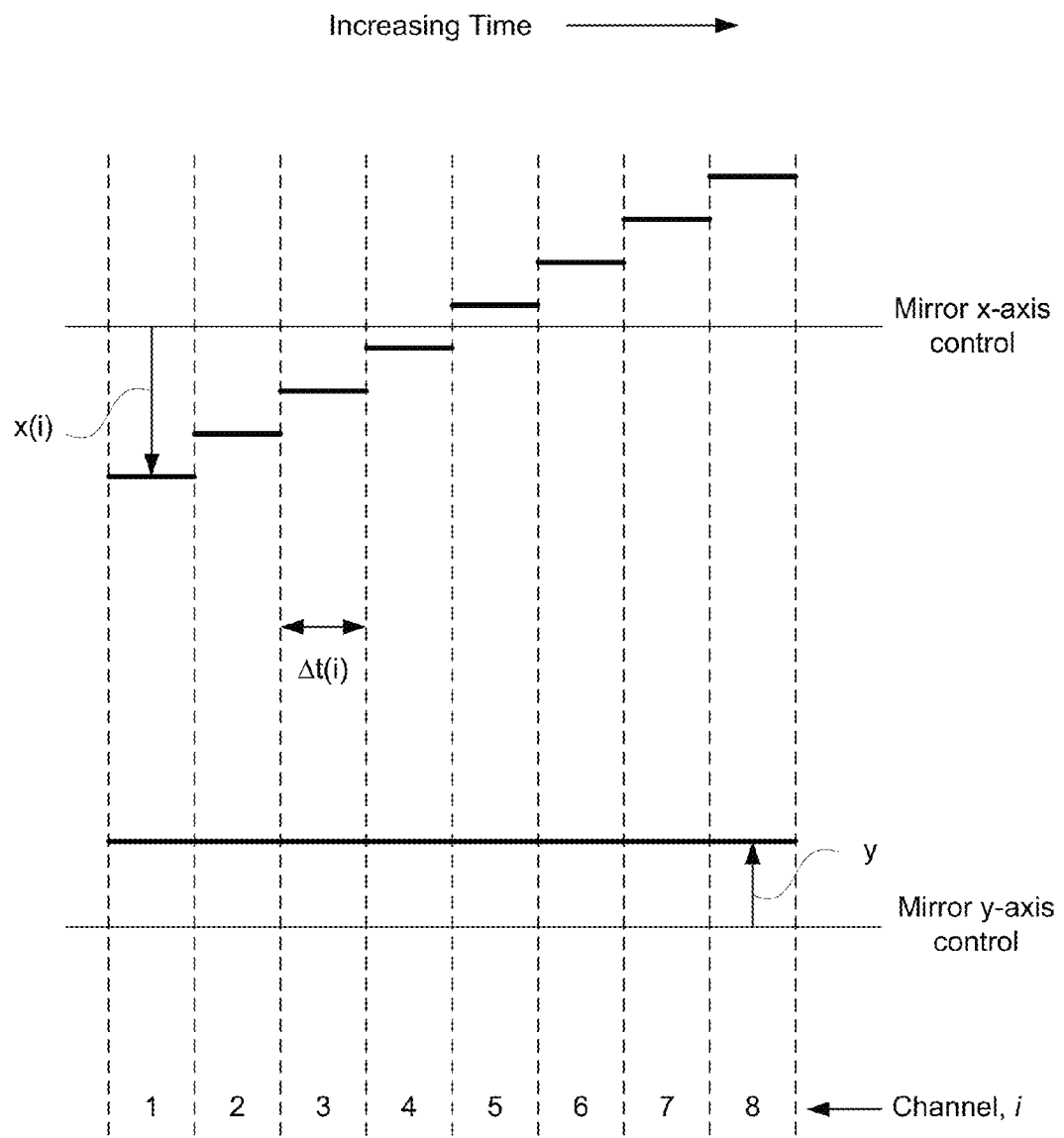
FIGS. 12A and 12B provide graphic representations of different programmable parameters that are used in monitoring optical channels using the OCM device of FIG. 11.
Figure 12B:
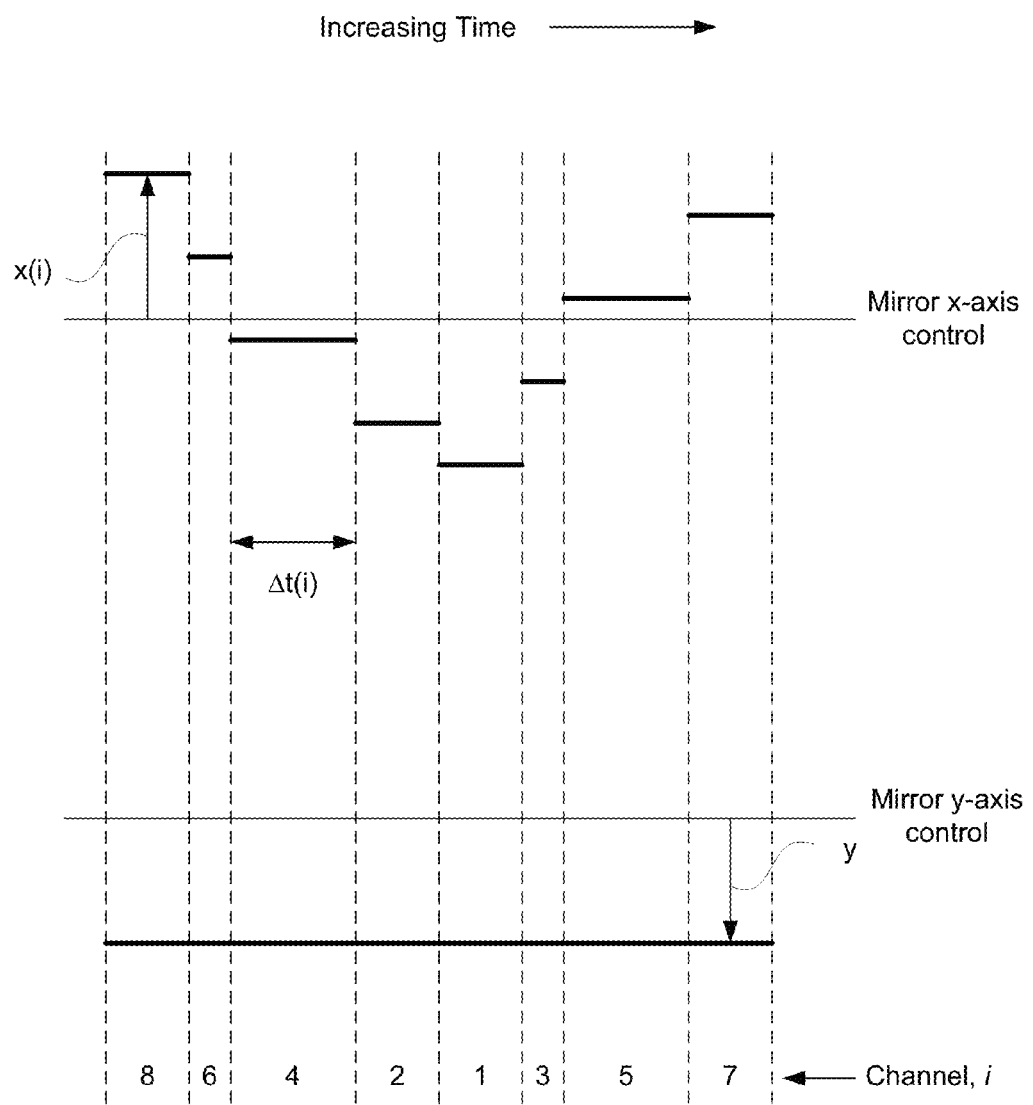

FIGS. 12A and 12B provide graphic representations of different sets of programmable parameters that can be used in monitoring optical channels using the OCM device 1100. In FIG. 12A, the time interval values associated with all the channels are equal. This means that light from all channels will be monitored for the same time duration. The y-axis control value is also the same in FIG. 12A for all channels. This means that light from all channels will be directed to the same photodetector. The varying x-axis control values in FIG. 12A indicate that tuning mirror 1150 rotates about the x-axis by different amounts in accordance with the x-axis control values associated with the channels. FIG. 12B illustrates an optical channel monitoring scheme where the time intervals associated with the channels are different and the channels are monitored out of order. The y-axis control value in FIG. 12B is also different from the y-axis control value in FIG. 12A, indicating that a different photodetector is being used for optical monitoring.

Figure 13:
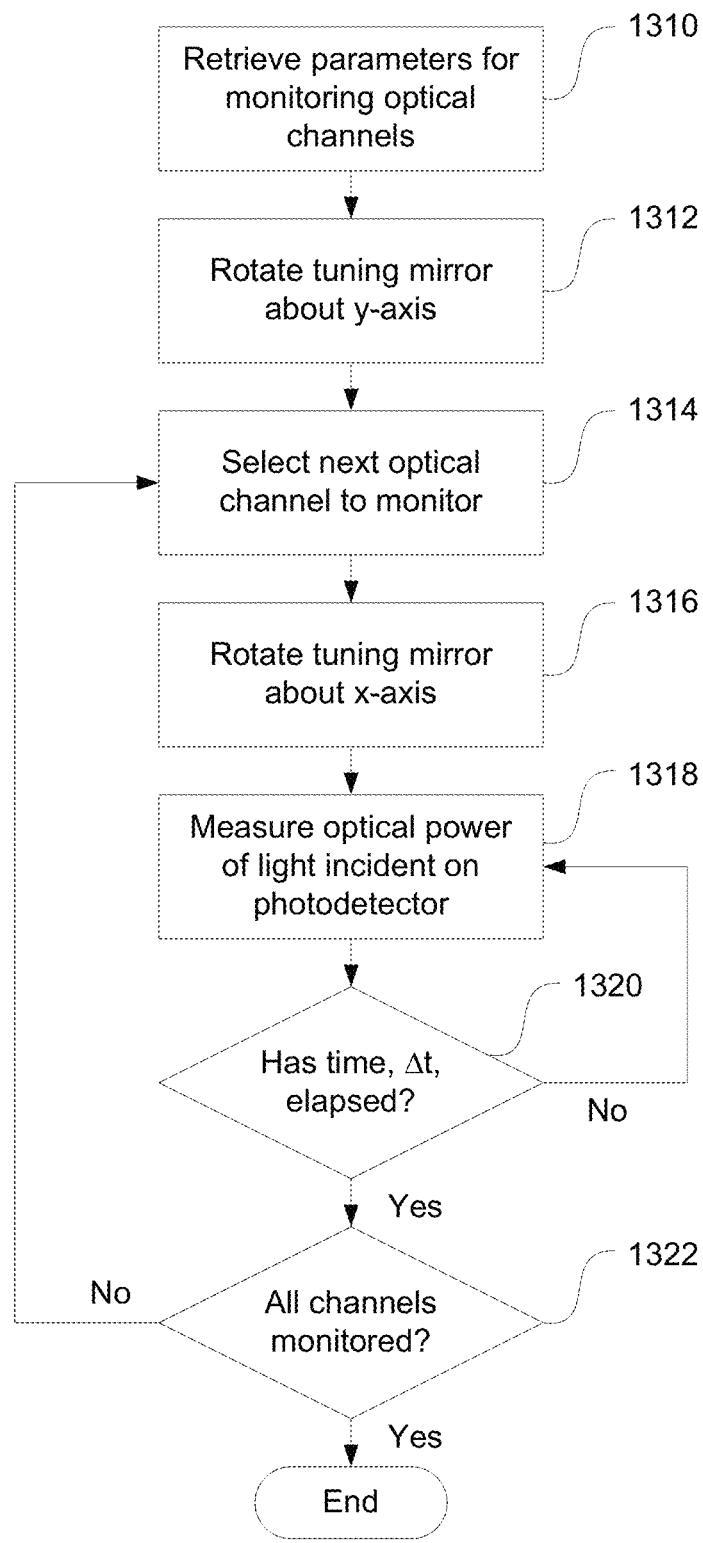
FIG. 13 is a flow diagram of a method of monitoring an optical signal according to an embodiment of the present invention.

FIG. 13 is a flow diagram of a method of monitoring an optical signal according to an embodiment of the present invention. In the description provided herein, the method is applied to the OCM device 1100. However, it should be recognized that the application of this method is not limited to the OCM device 1100 and may be applied to optical channel monitoring devices with different configurations.

At step 1310, the parameters for monitoring optical channels are retrieved from memory 1162 by processor 1164 of control unit 1160. Processor 1164 then generates control signals for rotating tuning mirror 1150 about the y-axis based on the y-axis control value to cause the tuning mirror 1150 to rotate about the y-axis at step 1312. This positions tuning mirror 1150 to direct beams reflected thereby to one of the photodetectors 1120, hereinafter referred to as the "target photodetector." At step 1314, the next optical channel to be monitored is selected. The optical channels may be monitored in order as shown in FIG. 12A or out of order as shown in FIG. 12B. Processor 1164 then generates control signals for rotating tuning mirror 1150 about the x-axis based on the x-axis control value associated with the optical channel selected at step 1314 to cause the tuning mirror 1150 to rotate about the x-axis at step 1316. This positions tuning mirror 1150 to direct only the beam components of the optical channel selected at step 1314 to be directed at the target photodetector. The optical power of the light incident on the target photodetector is then measured at step 1318. Decision block at step 1320 ensures that step 1318 is carried out for a time duration equal to the time interval value, $\Delta t$, associated with the optical channel selected at step 1314. At step 1322, a check is made to see if all channels have been monitored. If so, the method terminates. If not, the method returns to step 1314, where another optical channel to be monitored is selected and steps 1316 through step 1322 are repeated.

Upon termination of the method of FIG. 13, new parameters for monitoring the optical channels may be input by the user to improve the measurements obtained at step 1318. For example, time interval values associated with certain channels may be adjusted up or down. In addition, optical signals from other sources may be monitored using a different one of the photodetectors 1120 by setting a different y-control value in the parameters for monitoring the optical channels.

While the foregoing is directed to embodiments of the present invention, other and further embodiments of the invention may be devised without departing from the basic scope thereof, and the scope thereof is determined by the claims that follow.

We claim:

1. A method of monitoring optical channels of an optical signal, comprising:
retrieving parameters for monitoring the optical channels including a first time period and a second time period;
transmitting the optical signal through an optical port;
wavelength dispersing the optical signal;

rotating a light reflecting element about a first axis to select a first portion of the wavelength dispersed optical signal to direct to a light detector comprising a plurality of photodiodes;

rotating the light reflecting element about a second axis to select a photodiode from the plurality of photodiodes to measure an optical power of the first portion of the wavelength dispersed optical signal for a first time duration equal to the first time period;

rotating the light reflecting element about the first axis to select a second portion of the wavelength dispersed optical signal to direct to the light detector; and rotating the light reflecting element about the second axis to select a photodiode from the plurality of photodiodes to measure an optical power of the second portion of the wavelength dispersed optical signal for a second time duration equal to the second time period.

2. The method of claim 1, further comprising:
adjusting at least one of the first and second time periods.

3. The method of claim 1, wherein the first and second time periods are the same.

4. The method of claim 1, wherein the first and second time periods are different.

5. The method of claim 1, wherein the first axis is generally orthogonal to an optical path of the optical signal transmitted through the optical port, and the second axis is orthogonal to the first axis.

6. The method of claim 1, wherein said directing of the first portion of the wavelength dispersed optical signal is carried out prior to said directing of the second portion of the wavelength dispersed optical signal.

7. The method of claim 1, wherein the parameters for monitoring the optical channels include a time period for monitoring each of the optical channels, the first time period corresponding to a time period for monitoring a first optical channel and the second time period corresponding to a time period for monitoring a second optical channel.

8. The method of claim 1, wherein the parameters include parameters that define a correspondence between one of the optical channels and the first portion of the wavelength dispersed optical signal and another one of the optical channels and the second portion of the wavelength dispersed optical signal.

9. A multi-channel optical signal monitoring device comprising:
an optical port through which the multi-channel optical signal is transmitted;
a light dispersion element positioned in an optical path of the multi-channel optical signal to wavelength disperse the multi-channel optical signal;
a light detector comprising a plurality of photodiodes; and
a beam steering element configured to:
rotate about a first axis to select a first portion of the wavelength dispersed optical signal to direct to the light detector;
rotate about a second axis to select a photodiode from the plurality of photodiodes to measure an optical power of the first portion of the wavelength dispersed optical signal for a first time duration equal to a first programmable value;
rotate about the first axis to select a second portion of the wavelength dispersed optical signal to direct to the light detector; and
rotate about the second axis to select a photodiode from the plurality of photodiodes to measure an optical power of the second portion of the wavelength dispersed optical signal for a second time duration equal to a second programmable value.

10. The device of claim 9, further comprising a storage unit for storing parameters for monitoring optical channels of the multi-channel optical signal, the parameters including the first programmable value and the second programmable value.

11. The device of claim 10, wherein the parameters include a time period for monitoring each of the optical channels, the first programmable value corresponding to a time period for monitoring a first optical channel and the second programmable value corresponding to a time period for monitoring a second optical channel.

12. The device of claim 9, wherein the first axis is generally orthogonal to an optical path of the multichannel optical signal transmitted through the optical port, and the second axis is orthogonal to the first axis.

13. A non-transitory computer-readable storage medium comprising instructions to be executed by a processing unit to cause a multi-channel optical signal monitoring device to carry out the steps of:
retrieving parameters for monitoring the optical channels including a first time period and a second time period;
rotating a beam steering element about a first axis to select a first portion of a wavelength dispersed optical signal to direct to a light detector comprising a plurality of photodiodes;
rotating the beam steering element about a second axis to select a photodiode from the plurality of photodiodes to measure an optical power of the first portion of the wavelength dispersed optical signal for a first time duration equal to the first time period;
rotating the beam steering element about the first axis to select a second portion of the wavelength dispersed optical signal to direct to the light detector; and
rotating the beam steering element about the second axis to select a photodiode from the plurality of photodiodes to measure an optical power of the second portion of the wavelength dispersed optical signal for a second time duration equal to the second time period.

14. The non-transitory computer-readable storage medium of claim 13, wherein the instructions to be executed by the processing unit cause the multi-channel optical signal monitoring device to carry out the further step of:
detecting a user input; and
adjusting at least one of the first and second time periods in accordance with the user input.

15. The non-transitory computer-readable storage medium of claim 13, wherein the first and second time periods are the same.

16. The non-transitory computer-readable storage medium of claim 13, wherein the first and second time periods are different.

17. The non-transitory computer-readable storage medium of claim 13, wherein the parameters include parameters that define an order of monitoring the optical channels.

* * * * *